(12) United States Patent
Sorg

(10) Patent No.: US 7,441,618 B2
(45) Date of Patent: Oct. 28, 2008

(54) ELECTRICAL DRIVE SYSTEM FOR A VEHICLE WITH SKID STEERING

(75) Inventor: Johannes Sorg, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 417 days.

(21) Appl. No.: 10/573,452

(22) PCT Filed: Aug. 28, 2004

(86) PCT No.: PCT/EP2004/009614

§ 371 (c)(1),
(2), (4) Date: Apr. 18, 2006

(87) PCT Pub. No.: WO2005/039958

PCT Pub. Date: May 6, 2005

(65) Prior Publication Data

US 2006/0283641 A1     Dec. 21, 2006

(30) Foreign Application Priority Data

Sep. 26, 2003    (DE)  ............................... 103 44 711

(51) Int. Cl.
    *B60K 1/00*     (2006.01)
(52) U.S. Cl. ...................... 180/65.6; 180/65.1; 180/65.7
(58) Field of Classification Search ................. 180/65.1, 180/65.6, 65.7; B60K 1/00
See application file for complete search history.

(56) References Cited

U.S. PATENT DOCUMENTS

| | | | |
|---|---|---|---|
| 4,998,591 A | 3/1991 | Zaunberger | |
| 5,041,064 A | 8/1991 | Eickhoff et al. | |
| 5,445,234 A | 8/1995 | Hall, III | |
| 5,730,677 A * | 3/1998 | Sorg et al. | ...................... 475/19 |
| 6,032,751 A * | 3/2000 | Loichinger et al. | ........... 180/6.7 |
| 6,155,955 A * | 12/2000 | Boss et al. | ................... 477/107 |
| 6,691,806 B2 | 2/2004 | Wolfgang et al. | |
| 2003/0010547 A1* | 1/2003 | Wachauer | .................. 180/65.1 |
| 2005/0284672 A1 | 12/2005 | Egen et al. | |
| 2008/0091309 A1* | 4/2008 | Walker | ........................... 701/1 |

FOREIGN PATENT DOCUMENTS

| | | |
|---|---|---|
| DE | 38 33 784 A1 | 4/1989 |
| DE | 100 05 527 A1 | 8/2001 |
| DE | 102 22 812 A1 | 12/2003 |
| EP | 0 304 594 A2 | 3/1989 |
| EP | 0 307 688 A2 | 3/1989 |
| EP | 0 319 323 A1 | 6/1989 |
| WO | WO-02/083483 A1 | 10/2002 |

* cited by examiner

*Primary Examiner*—Christopher Ellis
*Assistant Examiner*—Jacob Meyer
(74) *Attorney, Agent, or Firm*—Davis Bujold & Daniels, P.L.L.C.

(57) ABSTRACT

An electrical drive system for a vehicle with a skid steering element exhibits a homogeneous electrical drive engine and a homogeneous gear unit (16, 18) on the left and on the right side in each case, which are propelled by a drive engine (2,4), assigned in each case, and over a power drive flange (28, 40) to propel a track or a drive wheel. Two transfer elements (26, 24) of the left gear unit (16), which do not form the drive, are directly connected by a mechanical gear train crosswise in each case with both transfer elements (36, 38) of the right gear unit, which do not form the drive.

4 Claims, 1 Drawing Sheet

ELECTRICAL DRIVE SYSTEM FOR A VEHICLE WITH SKID STEERING

This application is a national stage completion of PCT/EP2004/009614 filed Aug. 28, 2004 which claims priority from German Application Serial No. 103 44 711.3 filed Sep. 26, 2003.

FIELD OF THE INVENTION

The invention concerns an electrical drive system for a vehicle with a skid steering element.

BACKGROUND OF THE INVENTION

Vehicles with a skid steering element are tracked vehicles or wheeled vehicles in which, while driving along curves, the inner drive chain and/or the inner drive wheels are slowed down in each case opposite the outer drive chain and/or the outer drive wheels. In particular, with heavy tracked vehicles, this requires substantial brake performances on the inner drive chain.

There are well-known different systems, which permit this brake performance being supplied to the outer drive chain. With a mechanical or hydrostatic-mechanical, superimposed, steering gear with a steering gear part and a driving transmission part, as is revealed in DE 38 33 784 A1. For this, a zero-shaft propelled by the steering gear part and the performance exchange from the inner drive chain to the outer drive chain is intended to be made mechanically by the driving transmission part.

DE 100 05 527 A reveals a diesel electric drive system with each of the two chains assigned its own electrical drive system, whereby no mechanical connections exist between them. The power transmission between the left and right side takes place exclusively in an electrical way, what permits a space-favorable arrangement of the drive components. However, it requires an efficient electrical system and high performance electrical drive engines.

EP 0 304 594 A, likewise, shows a diesel electric, drive system which, in addition, exhibits a mechanical superimposed steering gear. For drive and guidance drive in each case, an electrical driving motor of a different size is intended. With this drive system, the power transmission between the left and the right side takes place exclusively mechanically. This well-known drive system is, however, very complex and not optimal as far as space constrictions are concerned. There is needed not only a diesel engine and a complex mechanical superimposed steering gear, but beyond that still another high performance generator and two electrical drive engines. traveling straight ahead avoids drive engine stress and the installed performance of the guidance driving motor is not activated.

WO 02/083483 A shows a drive system, with which homogeneous electrical drive machines are arranged on each side and with which, in addition, a central third electric motor is intended as a guidance engine. Finally, U.S. Pat. No. 5,445, 234 shows, as most state of the art, the drive system for a vehicle with a skid steering element under consideration. This exhibits one left and one homogeneous right electrical drive engine. This electrical drive system serves both electrical drive engines at the same time, as well as drive and steering trains. The fully installed electrical, drive power is available for traveling straight ahead. The power transmission between the left and right side takes place partly mechanically and partly electrically.

A gear unit is arranged on each side of the planetary gears. The planet pinion cages of these two gear units form the two drives, which affect the tracks. The sun gear of the left gear unit becomes propelled over a spur gear stage of the left drive engine and the sun gear of the right gear unit over a spur gear stage of the right drive engine. The two internal gears of the left and right gear unit are turning rigidly connected by a connecting shaft. In addition, a gear train is arranged between the sun gear of the left gear unit and the sun gear of the right gear unit, which also couples the two drive engines with one another. Thus, now while driving along curves, the two drive engines can be operated with different numbers of revolutions; this gear train concentrically exhibits a differential gear.

The task of the invention is to indicate a generically-conforming drive system for a vehicle with a skid steering element which gets along without such a concentric differential gear.

SUMMARY OF THE INVENTION

On the basis of a generically-conforming drive system, the solution of this task takes place via two bear units exhibiting two transfer elements, which are not assigned to the respective drive. If the drive is formed by the planet pinion cage, these two transfer elements are thus the sun gear and the internal gear. One of these transfer elements is designated "first" and the other one of these transfer elements "second". According to the invention, the first transfer element of the left gear unit thus, the first left transfer element, is directly connected through a first mechanical gear train with the second transfer element of the right gear unit, thus the second right transfer element and the first right transfer element is connected directly through a second mechanical gear train with the second left transfer element. The two gear trains are between different transfer elements of the two gear units crosswise with one another, thus in each case directly connected—thus without a compensating element like a differential gear.

Between the left and the right gear unit only two shafts must be placed, which takes only a small building area.

The terms "left" and "right" drive engine are, in connection with the invention, to be understood in such a way that the "left" drive engine is connected with a first transfer element of the left gear unit and the "right" drive engine is connected with an appropriate transfer element of the right gear unit. The two drive engines must be arranged in the vehicle, although not necessarily on the left and on the right of the vehicle, but can arranged concentrically one behind the other or concentrically one above the other, depending upon vehicle configuration.

Although different designs can be used, it is favorable if each gear unit is designed as a planetary gear unit with several planetary gears, which are stored in a swiveling planetary unit and in synchronous operation with a sun gear and an internal gear, whereby in each case the planet pinion cage of the drive member, the internal gear, the first transfer element and the sun gear form the second transfer element.

In a favorable arrangement, the invention requires that the first mechanical, torque-proof, gear train with the internal gear of the left gear unit be connected to the first spur gear, with the torque-proof sun gear of the right gear unit connected to the second spur gear and a connecting shaft, which exhibit a third and a fourth spur gear at their ends, whereby the third with first and the fourth with the second spur gear stand in interference. Accordingly, the second mechanical gear train is built torque-proof with an internal gear of the right gear unit connected to the fifth spur gear with a torque-proof, sun gear of the left gear unit connected to the sixth spur gear and a second connecting shaft, which exhibit a seventh and an eighth spur gear at their ends, whereby the seventh with the fifth and the eighth with the sixth spur gear stand in interference. For better utilization of energy, an electrical middle enclosure can be placed between the left and the right electrical drive engines, which at least in certain operating conditions, an electrical performance leads from the left drive engine working as a generator to the right drive engine working as engine and in reverse.

Finally, protection is desired for the gear unit, which is built for an electrical drive system according to the invention.

BRIEF DESCRIPTION OF THE DRAWINGS

The invention will now be described, by way of example, with reference to the accompanying drawings in which.

DETAILED DESCRIPTION OF THE INVENTION

Figure 1:
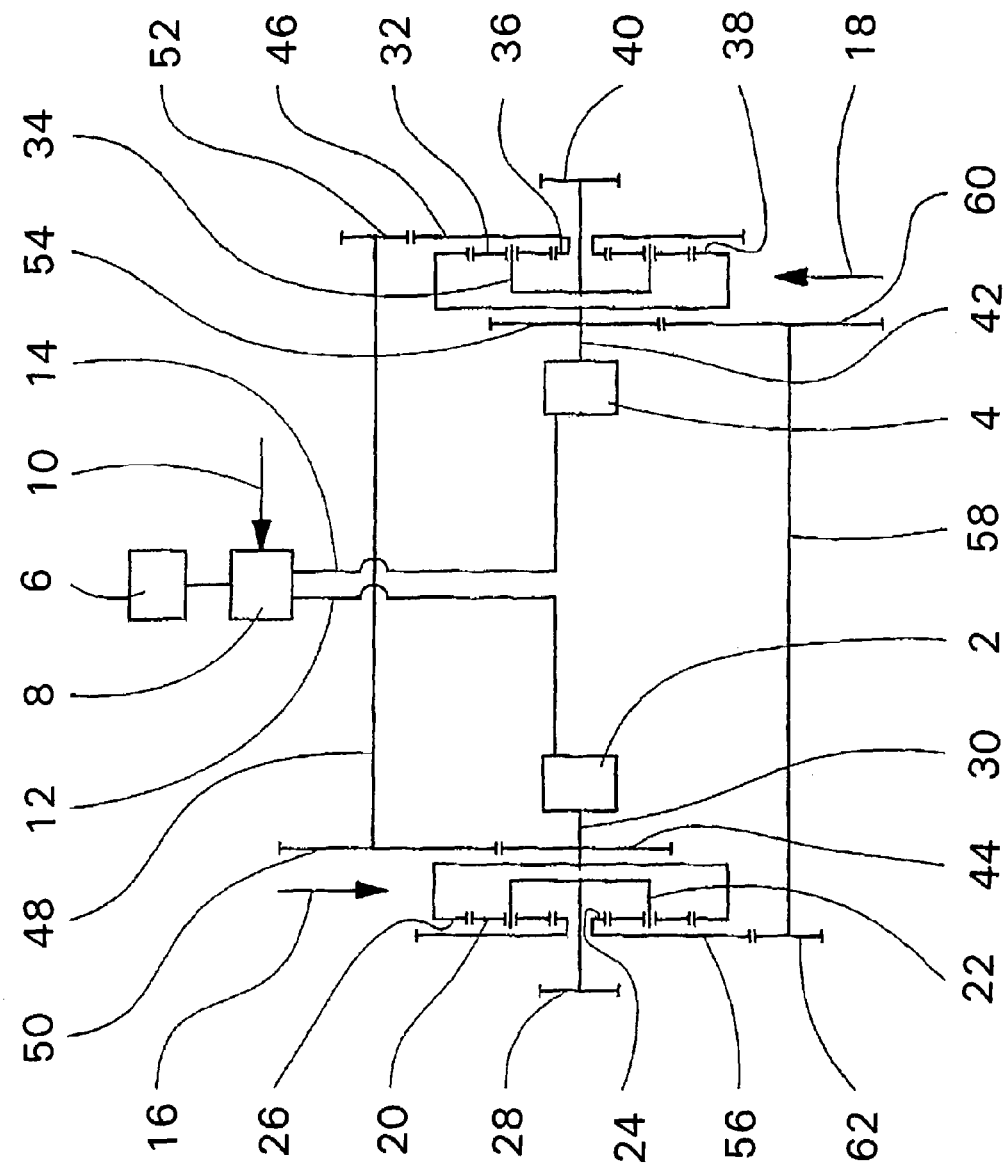
FIG. 1 schematically shows an electrical drive system for a vehicle with a skid steering element, according to the present invention.

The invention is described on the basis of the enclosed design, which schematically shows an electrical drive system, according to the invention, for a vehicle with a skid steering element. In it, the left electrical, drive engine is marked with 2 and a right electrical drive engine with 4. An electrical energy source 6 can consist of a combination of a diesel engine with an electrical generator or also of a battery or a gas cell. An electronic control unit 8 covers control hard- and software as well as power electronics. Depending on a control input signal 10, which the driver produces by manipulation of unrepresented controls, into the two electric drives 2, 4 over lines 12, 14, depending on the control input signals 10, the appropriate number of revolutions are performed. A left gear unit 16 exhibits several planetary gears 20, which are stored on a swiveling planet, pinion cage 22. The planetary gears 20 are in synchronous operation with a sun gear 24 and an internal gear 26. The planet, pinion cage 22 forms the drive member and is connected by a flange 28 with an unspecified star of the track drive assembly. The internal gear 26 is connected by a shaft 30 with the left drive engine 2. With a homogeneous right gear unit 18, the planetary gears are designated as 32, a planet, pinion cage as 34, a sun gear as 36, an internal gear as 38 and a drive flange as 40. A shaft 42 connects the right drive engine 4 with the internal gear 38.

The internal gear 26 of the left gear unit is directly connected with the sun gear 36 of the right gear unit. A mechanical gear train serves for this, which is formed by a torque-free, spur gear 44 connected with the internal gear 26, with which the torque-free, sun gear 36 of the right gear unit 18 is connected to a spur gear 46 and a connecting shaft 48, which exhibit a spur gear 50 and a spur gear 52 at their ends. The spur gear 50 is in constant meshing with the spur gear 44 and spur gear 52 with the spur gear 46.

In an appropriate way, the internal gear 38 of the right gear unit is connected directly with the sun gear 24 of the left gear unit. The mechanical gear train is arranged with a torque-free, spur gear 54, connected between them with the internal gear 38 of the right gear unit 18, which is connected to a spur gear 56 and a connecting shaft 58 with the sun gear 24 of the left gear unit 16, which exhibit a spur gear 60 and a spur gear 62 at their ends. The spur gear 60 is in constant meshing with the spur gear 54 and the spur gear 62 with the spur gear 56.

While traveling straight ahead, the largest part of the drive power of each electrical drive engine 2, 4 will transfer to the power drive flange 28, 40 assigned in each case. To a certain degree, however, the left electrical, drive engine drives the right chain and the right electrical, drive engine the left chain. While driving around curves, the performance of the internal drive motor flows to the outer power, drive flange in reverse, so that a mechanical net performance flowing to the outside track is present. Beyond that, also an electrical performance can be led from the inner drive engine to the outer drive engine over the lines 12, 14.

To a large extent, the range of the vehicle cab in the center of the vehicle remains running free from drive components, with only the two connecting shafts 48, 58. The two connecting shafts can be arranged on opposite sides of an axle center of the gear units or, in addition, include an angle smaller than 180° with this axle center, depending upon the requirements of the vehicle configuration.

REFERENCE NUMERALS 2 electrical drive engine
4 electrical drive engine
6 energy source
8 control unit
10 control input signal
12 line
14 line
16 gear unit
18 gear unit
20 planetary gear
22 planet pinion cage
24 sun gear
26 internal gear
28 drive flange
30 shaft
32 planetary gear
34 planet pinion cage
36 sun gear
38 internal gear
40 drive flange
42 shaft
44 spur gear
46 spur gear
48 connecting shaft
50 spur gear
52 spur gear
54 spur gear
56 spur gear
58 connecting shaft
60 spur gear
62 spur gear

The invention claimed is:

1. An electrical drive system for a vehicle with a skid steering element having at least:
   a left electrical drive engine (2) and a homogeneous right electrical drive engine (4);
   an electrical energy source (6);
   an electrical control unit (8) for independently increasing a number of revolutions at the left electrical drive engine (2) and the right electrical drive engine (4);
   a left gear unit (16), connected with one of a left drive wheel or track of a left drive unit (22, 28), and the left drive engine (2) is connected with a first left transfer element (26) and a second left transfer element (24);
   a homogeneous right gear unit (18) connected with one of a right drive wheel or track of a right drive unit (34, 40), and the right drive engine (4) is connected with a first right transfer element (38) and a second right transfer element (36); and a first left transfer element (26) is connected directly with the second right transfer element (36) by a first mechanical gear train (44, 50; 48, 52; 46), and the first right transfer element (38) is connected directly with the second left transfer element (24) by a second mechanical gear train (54, 60; 58, 62; 56).

2. The drive system according to claim 1, wherein the left gear unit (16) and the right gear unit (18) comprise planetary gears with several planetary gears (20, 32), the several planetary gears (20, 32) swiveling on a planet pinion cage (22,34) and in synchronous operation with a sun gear (24, 36) and an internal gear (26, 38), in each case, the planet pinion cage (22, 34) of the drive unit, the internal gear (26, 38) of the first transfer element and the sun gear (24, 36) form the second transfer element.

3. The drive system according to claim 2, wherein a first mechanical gear train is formed by a torque-proof first spur gear (44), connected with the internal gear (26) of the left gear unit (16), a torque-proof second spur gear (46) and a first connecting shaft (48) connected with a sun gear (36) of the right gear unit (18), which has at adjacent opposite ends thereof a third spur gear and a fourth spur gear, the third spur gear (50, 52) with a first spur gear (44) and a fourth spur gear (52) with the second spur gear (46) stand in interference, and a second mechanical gear train is formed by a torque-proof fifth spur gear (54) connected with the internal gear (38) of the right gear unit (18), connecting a sixth spur gear (56) and a second connecting shaft (58) with the sun gear (24) of the left gear unit (16), which has at adjacent opposite ends thereof a seventh spur gear (60) and an eighth spur gear (62), the seventh spur gear (60) with the fifth spur gear (54) and the eighth spur gear (62) with the sixth spur gear (56) stand in interference.

4. The drive system according to claim 1, wherein electrical middle enclosures (8, 12, 14) are placed between the left and the right electrical drive engines (2, 4) and, for certain operating conditions, electrical performance of the left drive engine (2) working as a generator leads to the right drive engine (4) working as an engine and in a reverse drive direction.

\* \* \* \* \*